United States Patent
Mills et al.

(10) Patent No.: US 6,752,562 B2
(45) Date of Patent: Jun. 22, 2004

(54) QUICK INSTALL POSITIVE LOCK PIN

(75) Inventors: John S. Mills, Orange, CA (US);
James M. Snyder, La Habra, CA (US);
Walter Tsui, Huntington Beach, CA (US)

(73) Assignee: The Boeing Company, Chicago, IL (US)

(*) Notice: Subject to any disclaimer, the term of this patent is extended or adjusted under 35 U.S.C. 154(b) by 0 days.

(21) Appl. No.: 10/093,547

(22) Filed: Mar. 8, 2002

(65) Prior Publication Data

US 2003/0170070 A1 Sep. 11, 2003

(51) Int. Cl.[7] .............................................. F16B 21/14
(52) U.S. Cl. .................. 403/322.1; 403/321; 403/325; 403/327; 403/328; 24/453; 411/347
(58) Field of Search .............................. 403/315–317, 403/321, 322.1–322.4, 325–327, 154; 24/453; 280/515; 411/347, 348, 24

(56) References Cited

U.S. PATENT DOCUMENTS

| | | | |
|---|---|---|---|
| 476,362 A | * | 6/1892 | Breisch |
| 883,833 A | * | 4/1908 | Rossi |
| 3,534,650 A | * | 10/1970 | Kubokawa |
| 3,596,554 A | * | 8/1971 | Low et al. |
| 3,921,334 A | * | 11/1975 | Black, Sr. |
| 3,936,203 A | | 2/1976 | Lowder et al. |
| 4,355,917 A | * | 10/1982 | Bunger ................. 403/322.1 X |
| 4,483,639 A | * | 11/1984 | McCandless, II ........... 403/317 |
| 4,582,079 A | * | 4/1986 | Fields .................... 403/330 X |
| 5,100,256 A | | 3/1992 | Estep |
| 5,233,770 A | | 8/1993 | Robinson |
| 5,394,594 A | * | 3/1995 | Duran ................... 403/321 X |
| 5,437,515 A | | 8/1995 | Kuramoto et al. |
| 5,517,734 A | * | 5/1996 | Korpi |
| 5,772,355 A | | 6/1998 | Ross et al. |
| 5,865,559 A | * | 2/1999 | Yang ....................... 403/322.1 |
| 6,152,645 A | | 11/2000 | Sanford |
| 6,158,917 A | | 12/2000 | Wolin et al. |
| 6,193,261 B1 | * | 2/2001 | Hahka |
| 6,386,789 B1 | * | 5/2002 | Chausse et al. ........... 403/322.2 |

FOREIGN PATENT DOCUMENTS

DE 3223302 A1 * 12/1983 ........... F16B/21/14

* cited by examiner

Primary Examiner—Lynne H. Browne
Assistant Examiner—Ryan M. Flandro
(74) Attorney, Agent, or Firm—Artz & Artz, PC

(57) ABSTRACT

A quick install positive lock pin for locking a plurality of objects together includes a handle portion which is in communication with a handle housing. The handle housing has an interior cavity within which a shaft member is disposed. The pin also includes a pair of retention mechanisms located in the handle portion that are moveable between a locked position where the mechanism extends outwardly of a slot formed in the handle housing and an unlocked position where the mechanisms extend no further than the outer edge of the opening. The retention mechanisms include a pair of plates that rotate upon reciprocal movement of the shaft member to move the retention mechanisms between the locked position and the unlocked position.

12 Claims, 1 Drawing Sheet

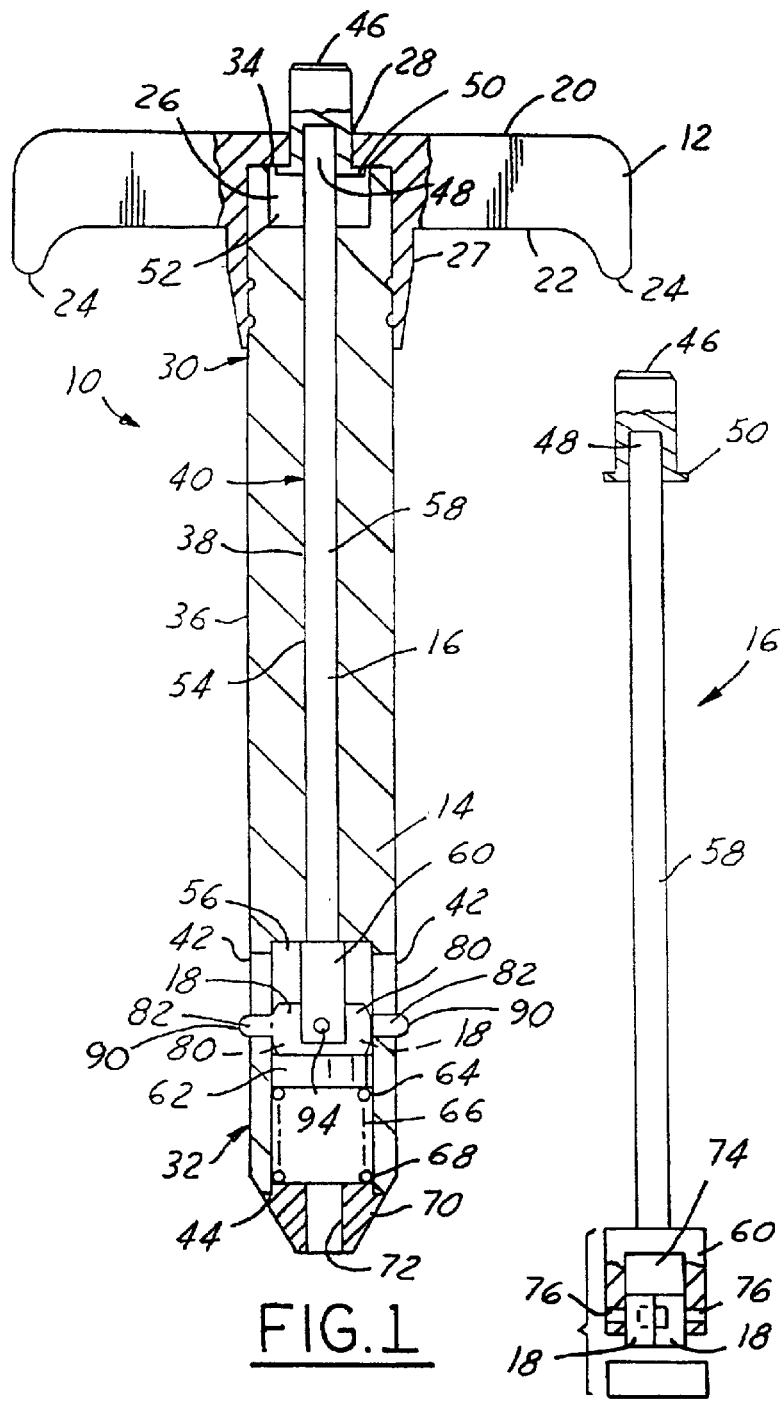
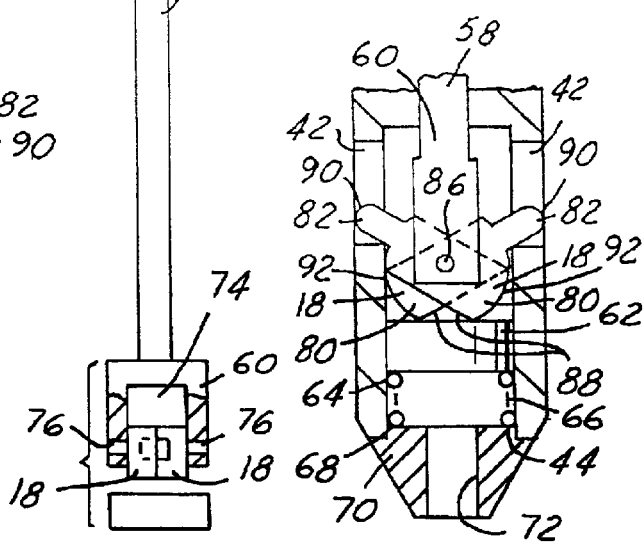
FIG.1   FIG.2   FIG.3

QUICK INSTALL POSITIVE LOCK PIN

TECHNICAL FIELD

The present invention relates generally to connecting pins that are used to secure two or more objects together.

BACKGROUND OF THE INVENTION

A variety of positive lock pins are well known in the art. Positive lock pins are typically utilized to quickly install a secure connector in a joint or other location to thereby lock two or more objects together.

One known positive lock pin that is widely utilized is generally referred to as a pip-pin. As is known, pip-pins are typically used to lock two or more objects together in applications where a clamping force is not needed. The locking function of these pip-pins is accomplished through the utilization of a protruding ball lock mechanism. As is known, the ball lock mechanism is comprised of a pair of balls that are positioned to communicate with holes in opposing sides of the pip-pins. Each of the pair of balls extends outwardly through a respective hole such that its outermost portion extends beyond the diameter of the pip-pin. In this locked position, the balls prevent the pip-pin from being removed from the hole into which it inserted. To remove the pip-pins, the ball lock mechanism is retracted which allows the pip-pin to be removed from the hole into which it is inserted.

One known application for these pip-pins includes the attachment of Ground Support Equipment together with associated flight hardware. Another known application for these pip-pins is for the International Space Station where they are used to assemble mechanisms and the large truss structures in space. These pip-pins have applications that are both temporary and permanent. In either event, current pip-pins have a reliability problem where the balls, which form part of the locking mechanism, can fall outwardly through the hole and therefore become detached from the pin. Obviously, if the balls fail, the retention capability of the pip-pins is diminished. Furthermore, the loose balls can contaminate critical hardware and may cause malfunction.

One of the principal reasons that the ball mechanisms fail is due to vibrations forces that act on the pip-pins. With current pip-pins, the ball devices are swaged into place to provide a retention mechanism for the pin. Because the ball devices are swaged into the holes from the outside, the large vibration forces that act on the pip-pins, due to the applications in which the pip-pins are employed, can cause the ball devices to fall out of the holes. As is known, the swaging process provides relatively weak retention capabilities. Accordingly, efforts have been made to increase the retention capabilities of these balls, including by increasing the amount of swaging of the ball devices. This increased swaging, however, decreases the amount of retention capability of the pin. This is because, by increasing the amount of swaging, the ball devices protrude out of the pin a lesser distance. This increased swaging further requires the diameter of the hole in which the pip-pin is placed to be machined to tighter tolerances in order to insure retention of the pip-pin in the hole.

Because of the unreliability of these pip-pins, they must be frequently replaced and/or repaired when failed. This increases the cost of the pip-pins as well as the associated service costs. Moreover, if the pip-pins fail altogether, this failure can have a more significant impact on the application in which they are being utilized.

SUMMARY OF THE INVENTION

It is therefore an object of the present invention to provide a quick install positive lock pin that provides increased retention capabilities.

It is another object of the present invention to provide a quick install positive lock pin that has improved reliability.

It is still another object of the present invention to provide a quick install positive lock pin that requires less installation time.

It is a further object of the present invention to provide a quick install positive lock pin that allows for easier inspection to determine the propriety of its installation.

In accordance with the above and the other objects of the present invention, a quick install positive lock pin is provided. The positive lock pin is intended to lock a plurality of objects together and includes a handle portion. The handle portion has a handle housing in communication therewith. The handle housing has a shaft member disposed therein, which is reciprocal with respect to the handle housing. The handle housing has at least one retention mechanism disposed therein, which is in communication with a pocket formed in the shaft member. The at least one retention mechanism is pivotable between a locked position and an unlocked position. In the locked position, the at least one retention mechanism extends outwardly from the outer surface of the pin. In the unlocked position, the outermost portion of the at least one retention mechanism is located inwardly of the outer surface of the pin. The at least one retention mechanism is maintained in the locked position by an upwardly spring force. The at least one retention mechanism is moveable to the unlocked position by linear movement of the shaft member with respect to the handle housing. Linear movement of the shaft member causes the spring associated with the at least one retention mechanism to be depressed, which allows the at least one retention mechanism to pivot such that its outermost portion does not extend beyond the outer surface of the pin. The at least one retention mechanism is fixedly secured to the shaft member adjacent the pocket.

Other objects and features of the present invention will become apparent when viewed in light of the detailed description of the preferred embodiment when taken in conjunction with the attached drawings and appended claims.

BRIEF DESCRIPTION OF THE DRAWINGS

FIG. 1 is a cross-sectional view of a quick install positive lock pin in an locked position in accordance with a preferred embodiment of the present invention;

FIG. 2 is a side view partially broken away of a shaft member for a quick install positive lock pin in accordance with a preferred embodiment of the present invention; and FIG. 3 is a cross-sectional view of a bottom portion of a quick install positive lock pin in an unlocked position in accordance with a preferred embodiment of the present invention.

DETAILED DESCRIPTION OF THE PREFERRED EMBODIMENT

Referring now to FIGS. 1 through 3, a quick install positive lock pin 10 is illustrated. The pin 10 is preferably intended to be utilized to lock a plurality of objects together. It will be understood that the pin 10 can be utilized in a variety of applications, including both temporary and permanent installations. Moreover, the pin 10 is preferably utilized in shear applications where a clamping force is not necessary and can be sized to lock any number of objects together. The terms "upward" and "downward" are used herein for directional orientation with respect to the drawings. These directional terms are not intended to be construed as limiting the orientation of the pin 10 when in use.

The pin 10 includes a handle portion 12, a handle housing 14, a shaft member 16, and a pair of retention mechanisms 18. The handle portion 12 has a generally planar top surface 20, a generally planar bottom surface 22, a pair of opposing flanged end portions 24, and a hollow recess 26 formed in the bottom surface 22. The bottom surface 22 also includes a downwardly extending circular portion 27. The top surface 20 has an opening 28 therein, which is in communication with the recess 26.

The handle housing 14 is preferably generally cylindrical in shape and has an upper portion 30 and a lower portion 32. The upper portion 30 is preferably telescopically disposed in the circular portion 27 and extends upwardly into the hollow recess 26. The handle housing 14 has an open top end 34. The handle housing 14 is preferably secured to the handle portion 12 by swaging and is oriented to extend in a generally perpendicular fashion with respect to the handle portion 12. However, the handle portion 12 and the handle housing 14 may be secured by a variety of other suitable methods. Alternatively, the handle portion 12 and the handle housing 14 may be integrally formed as a single piece. The handle housing 14 has an exterior surface 36 and an interior surface 38, which defines an interior cavity portion 40 within the handle housing 14. The wall thickness between the interior surface 38 and the exterior surface 36 is sufficient to provide the necessary strength for the locking and unlocking function, as discussed in more detail below. The lower portion 32 of the handle housing 14 has a pair of slots 42 formed therethrough and an open bottom end 44.

The shaft member 16 is disposed within the interior cavity portion 40. The shaft member 16, as shown best in FIG. 2, has a button portion 46 formed at an upper end 48 of the shaft member 16. The button portion 46 has a flange portion 50 located within the hollow recess 26 that is larger than the size of the opening 28 to allow only the button portion 46 to pass through the opening 28 in the top surface 20. This limits the distance of travel of the button portion 46. Moreover, the button portion 46 is sized to be telescopically received in the opening 28 in the top surface 20 of the handle portion 12. The upper end 48 of the shaft member 16 is secured within the button portion 46.

The interior cavity portion 40 has an upper section 52, a middle section 54, and a lower section 56. The upper section 52 is the location within which the button portion 46 linearly reciprocates. The middle section 54 preferably has a smaller diameter than the diameter of the upper section 52 and receives a middle portion 58 of the shaft member 16 therein. The lower section 56 of the cavity portion 40 has the retention mechanisms 18 disposed therein. The lower section 56 preferably has a diameter that is larger than the diameter of the middle section 54.

As shown in FIGS. 1 and 2, the upper end 48 of the shaft member 16 engages the button portion 46 and extends downwardly therefrom to the middle portion 58. The middle portion 58 is received within the middle section 54 of the cavity portion 40. The middle portion 58 extends downwardly from the upper end 48 and terminates at a lower end 60. The lower end 60 of the shaft member 16 is preferably larger in diameter than the middle portion 58 of the shaft member 16. Additionally, the lower end 60 is preferably larger than the middle section 54 of the cavity to limit upward travel of the shaft member 16. The shaft member 16, including the button portion 46, the upper end 48, the middle portion 58, and the lower end 60 are preferably formed as a single integral unit. However, the shaft member 16 may take on other forms and may be comprised of multiple pieces. The lower end 60 has a pocket 74 formed therein to accommodate the retention mechanisms 18. The pocket 74 also has a pair of apertures 76 formed in either side thereof.

The lower section 56 of the cavity includes the pair of retention mechanisms 18 disposed therein. The retention mechanisms 18 are in communication with the pair of slots 42, which are preferably formed on opposite sides of the handle housing 14. The retention mechanisms 18 are in communication with and preferably contact a spacer block 62. The other side of the spacer block 62 is in communication with an upper portion 64 of a spring 66. The spring 66 normally urges the spacer block 62 upward to provide support to the retention mechanism 18 and keep them in a normally locked position. The spring 66 has a lower portion 68 that rests on a bottom end 70 of the handle housing 14. The bottom end 70 is preferably welded to the handle housing 14. However, it will be understood that the bottom end 70 may be attached in a variety of different ways. Further, the bottom end 70 may also have an opening 72 formed therein.

Each of the pair of retention mechanisms 18 is located in the lower section 56 of the cavity portion 40. Each of the pair of retention mechanisms 18 is comprised of a plate portion 80 and a projection portion 82 that extends outwardly from the plate portion 80. The plate portion 80 is preferably integrally formed with the projection portion 82. The plate portions 80 each have an opening formed therein for receiving an axle 86. The axle 86 connects the two plate portions 80 together and allows the retention mechanisms 16 to move together. The axle 86 also preferably passes through the opposing apertures 76 formed in the lower end of the shaft member 16. Each of the plate portions 80 is generally cam shaped, i.e., has rounded or curved end portions.

Each of the plate portions 80 has a bottom surface 88 that rests on the spacer block 62. The retention mechanisms 18 are disposed in the cavity 40 such that each of the protruding portions 82 is received in one of the pair of slots 42 formed in the handle housing 14. More preferably, the retention mechanisms 18 are located in the pocket 74. The pair of slots 42 and thus the retention mechanisms 18 are preferably located to act approximately 180° apart or on opposing portions of the shaft member 16.

As shown in FIG. 1, the pin 10 is illustrated in a locked position, such as after it has been installed to hold two or more objects together. In the locked position, the spring 66 is in its normal unbiased position and maintains the spacer block 62 in its locking position. The spacer block 62 in turn keeps each of the retention mechanisms 18 in a generally horizontal position where the projection portions 82 extend outwardly of a respective one of the slots 42. The shaft member 16, which is attached to each of the retention mechanisms 18 by the axle 86, is also disposed upwardly such that button portion 46 is biased upwardly to its fully extended position. In this configuration, the projection portions 82 extend outwardly through their respective slots 42 such that their outermost points 90 protrude beyond the exterior surface 36 of the handle housing 14. The projection portions 82 extend outwardly far enough such that they give the pin 10 an effective diameter as measured from their respective outermost points 90 that is larger than the hole through which the pin 10 was inserted. This prevents the pin 10 from being removed and maintaining the locking function of the pin 10.

Referring now to FIG. 3, which illustrates the pin 10 in a released or unlocked position. In the released position, the pin 10 can be inserted into a hole to lock two or more objects together or may be removed from a hole to unlock the plurality of objects from one another. To move the pin 10 to the released position, the button portion 46 is depressed downwardly, which moves the lower end 60 of the shaft member 16 and causes the spring 66 to be depressed against its biasing force. As the button portion 46 and the shaft member 16 are moved downward, the spacer block 62 is moved downward, which allows each of the retention mechanisms 18 to pivot on the axle 86 about the lower end 60 of the shaft member 16.

The pivoting of each of the plate portions 80 causes the projection portions 82 to pivot upwardly within their respective slot 42. The slots 42 are each sized to accommodate rotation of the plate portions 80 and the projection portion 82. The pivoting of the plate portions 80 about the shaft member 16 causes the ends 92 of the plate portions 80 to drop downwardly with respect to the pivot point 94. The downward movement of the ends 92 and the rotation or pivoting of the plate portion 80 causes the projection portions 82 to be retracted or pivoted inwardly such that the outermost points 90 of each of the projection portions 82 reside within the slots 42 and, in any event, no further outwardly than the exterior surface 36 of the handle housing 14.

While a preferred embodiment of the present invention has been described so as to enable one skilled in the art to practice the present invention, it is to be understood that variations and modifications may be employed without departing from the purview and intent of the present invention, as defined in the following claims. Accordingly, the preceding description is intended to be exemplary and should not be used to limit the scope of the invention. The scope of the invention should be determined only by reference to the following claims.

What is claimed is:

1. A positive lock pin for locking a plurality of objects together, comprising:
   a handle portion;
   a handle housing in communication with said handle portion, said handle housing having a pair of slots, wherein said pair of slots are formed in said handle housing on approximately opposite sides thereof;
   a shaft member located within said handle housing and reciprocally moveable therewithin;
   a pair of retention mechanisms disposed within said handle housing and rotatably attached to said shaft member at a fixed location to move said pair of retention mechanisms between a locked position where an outermost point of each of said pair of retention mechanisms extends outwardly from a respective slot and an unlocked position wherein said outermost point of each of said retention mechanisms does not extend outwardly from a respective slot, wherein said pair of retention mechanisms each include a plate portion and a protruding portion for communicating with a respective one of said slots;
   a biasing spring disposed below said pair of retention mechanisms for maintaining said pair of retention mechanisms in said locked position; and
   a spacer block having an upper surface and a lower surface, said lower surface engaging said biasing spring and said upper surface engaging said plate portions.

2. The lock pin of claim 1, wherein said shaft member has an upper end, a middle portion, and a lower end and wherein said lower end includes a pocket formed therein for receipt of at least a portion of said plate portions therein.

3. The lock pin of claim 1, wherein said shaft member includes a button portion that allows said shaft member to be moved downwardly against the force of said biasing spring to cause said pair of retention mechanism to move to said unlocked position.

4. A quick install positive lock pin for locking a plurality of object together, comprising:
   a handle portion in communication with a generally downwardly extending handle housing;
   a shaft member disposed within a cavity formed in sold handle housing; and
   a pair of retention mechanisms disposed within said handle housing, each of said retention mechanisms in communication with a respective slot formed in said handle housing to move between a locked position and an unlocked position by linear movement of said shaft member, each of said retention mechanism being at least partially disposed within a pocket formed in a lower end of said shaft member and rotatably secured to said lower end at a fixed point, wherein said pair of retention mechanism are secured to each other and to said lower end of said shaft member by a pin;
   wherein each of said pair of retention mechanisms includes a plate portion an a projection portion, each of said plate portions being rotatably secured to said lower end of said shaft and said projection portions being in communication with a respective one of said slots, wherein each of said pair of plate portions has a generally planar bottom surface;
   a biasing spring in communication with said generally planar bottom surface; and
   a spacer block disposed between said plate portions and said biasing spring, an upper surface of said spacer block being in contact with said generally planar bottom surfaces and a lower surface of said spacer block being in communication with said biasing spring.

5. The lock pin of claim 4, wherein each of said pair of projection portions and said associated pair of slots are located on opposite sides of the pin.

6. The lock pin of claim 5, wherein each of said plate portions has a pair of opposing end portions that have a generally curved configuration.

7. The lock pin of claim 4 wherein said spring is disposed in said handle housing between said spacer block and a bottom end of said handle housing.

8. The lock pin of claim 7, wherein said shaft member includes a button portion that protrudes above said handle portion and allows said shaft member to be moved linearly within said handle housing.

9. A method of moving a quick install positive lock pin between a locked position and an unlocked position, comprising:
   providing a handle portion with a handle housing extending generally perpendicular therefrom;
   locating a shaft member within at least said handle housing;
   placing a pair of retention mechanisms in said handle housing and in rotatable communication with said shaft member at a fixed location on said shaft member;

placing a biasing spring in communication with a generally planar bottom surface of said pair of retention mechanisms;

disposing a spacer block between said retention mechanisms and said biasing spring, an upper surface of said spacer block being in contact with said generally planar bottom surfaces and a lower surface of said spacer block being in communication with said biasing spring; and moving said shaft member linearly to depress a spring, which allows said pair of retention mechanisms to rotate into and out of engagement with an associated slot formed in the handle housing, which thereby moves the pin between the looked position and the unlocked position.

10. The method of claim 9, further comprising:

receiving each of said retention mechanisms in a pocket formed in a lower end of said shaft member, thereby allowing said pair of retention mechanism to rotate.

11. The method of claim 10, further comprising:

forming opposing ends of said pair of retention mechanisms to allow them to pivot within a cavity formed in said handle housing.

12. The method of claim 10, further comprising:

biasing said shaft member upwardly to automatically return the pin from the unlocked position to the locked position.

* * * * *

UNITED STATES PATENT AND TRADEMARK OFFICE
CERTIFICATE OF CORRECTION

PATENT NO. : 6,752,562 B2
DATED : June 22, 2004
INVENTOR(S) : John S. Mills et al.

It is certified that error appears in the above-identified patent and that said Letters Patent is hereby corrected as shown below:

Column 6,
Line 15, delete "sold" and insert -- said --

Column 7,
Line 14, delete "looked" and insert -- locked --

Signed and Sealed this

Eighth Day of February, 2005

JON W. DUDAS
*Director of the United States Patent and Trademark Office*